US012325109B2

(12) United States Patent
Lee

(10) Patent No.: US 12,325,109 B2
(45) Date of Patent: Jun. 10, 2025

(54) RATCHET WRENCH STRUCTURE

(71) Applicant: Tsan-Chang Lee, Taichung (TW)

(72) Inventor: Tsan-Chang Lee, Taichung (TW)

( * ) Notice: Subject to any disclaimer, the term of this patent is extended or adjusted under 35 U.S.C. 154(b) by 350 days.

(21) Appl. No.: 18/081,878

(22) Filed: Dec. 15, 2022

(65) Prior Publication Data

US 2024/0198496 A1 Jun. 20, 2024

(51) Int. Cl.
*B25B 13/46* (2006.01)

(52) U.S. Cl.
CPC .................................. *B25B 13/463* (2013.01)

(58) Field of Classification Search
CPC .................................................... B25B 13/463
USPC ....................................................... 81/60, 61
See application file for complete search history.

(56) References Cited

U.S. PATENT DOCUMENTS 5,979,274 A 11/1999 Hsieh
7,444,903 B1 11/2008 Li
9,114,510 B2 * 8/2015 Lee ..................... B25B 23/0007
9,868,189 B2 * 1/2018 Lin ....................... B25B 13/463

* cited by examiner

*Primary Examiner* — Hadi Shakeri
(74) *Attorney, Agent, or Firm* — Justin Lampel

(57) ABSTRACT

A ratchet wrench structure includes a wrench body, a ratchet wheel, a pawl member, and an elastic member. The wrench body has a first receiving recess, and a second receiving recess. The first receiving recess is provided with a first circular arc, a first axis, a first vertical line, a first radius. The second receiving recess is provided with a second circular arc, a second axis, and a second radius. A first distance is defined between the first axis and the second axis. The ratchet wheel is pivotally mounted in the first receiving recess and has a ratchet toothed portion, and a mounting portion. The pawl member is mounted in the second receiving recess and has an engaging toothed portion, an extension face, an arcuate abutting face, and a curved surface. The elastic member is received in the second receiving recess.

3 Claims, 7 Drawing Sheets

RATCHET WRENCH STRUCTURE

BACKGROUND OF THE INVENTION

1. Field of the Invention

The present invention relates to a hand tool and, more particularly, to a ratchet wrench structure.

2. Description of the Related Art

A conventional ratchet wrench structure was disclosed in the U.S. Pat. No. 5,979,274, and has the following disadvantages. The blind hole 102 is formed in the wall of the second receiving recess by drilling. In fabrication, when the drill bit is drilled into the wrench body, the wrench body is disposed at an inclined angle so that the drill bit evades the wall of the first receiving recess. Then, the drill bit is inserted into the second receiving recess and aligns with the arcuate wall to drill the blind hole 102 with an oblique shape. Thus, the blind hole 102 is an oblique hole directed toward three dimensions. However, it is difficult to drill the blind hole 102 with three dimensions, thereby complicating the working process, and thereby increasing the cost of fabrication.

Another conventional ratchet wrench structure was disclosed in the U.S. Pat. No. 7,444,903, and has the following disadvantages.

1. The conventional ratchet wrench structure comprises many elements, including a wrench body 50, a pawl member 60, an elastic member 64, a ratchet wheel 70, a retaining ring 80, and a snapping member 90, so that such a conventional ratchet wrench structure has a complicated construction, thereby increasing the cost of production.
2. After the pawl member 60 is molded, a receiving groove is formed in the pawl member 60 by drilling to receive the elastic member 64. However, the pawl member 60 has an arcuate rear side so that it is uneasy to form the receiving groove in the arcuate rear side of the pawl member 60. As shown in FIG. 4, the receiving groove is located at the highest position of the arcuate rear side of the pawl member 60, so that when the drill bit is rotated quickly to contact the arcuate rear side, the drill bit easily deflects along the arcuate rear side, and the receiving groove is deviated from the exact position. Thus, it is very difficult to drill the receiving groove in the arcuate rear side of the pawl member 60, thereby increasing the working process and the cost of fabrication. Besides, the receiving groove has a small diameter so that the drill bit is easily broken during drilling.
3. The sliding face 62 is very close to the ratchet teeth 71 so that the clearance between the sliding face 62 and the ratchet teeth 71 is very small. Thus, when the pawl member 60 engages the ratchet teeth 71 of the ratchet wheel 70, the sliding face 62 of the pawl member 60 easily rubs and wears the ratchet teeth 71 of the ratchet wheel 70 due to friction between the sliding face 62 and the ratchet teeth 71.

BRIEF SUMMARY OF THE INVENTION

In accordance with the present invention, there is provided a ratchet wrench structure comprising a wrench body, a ratchet wheel, a pawl member, and an elastic member. The wrench body is provided with a first receiving recess, a second receiving recess, a first annular groove, and an abutting edge. The first receiving recess is provided with a first circular arc, a first axis, a first vertical line, a first radius. The second receiving recess is provided with a second circular arc, a second axis, and a second radius. A first distance is defined between the first axis and the second axis. The ratchet wheel is pivotally mounted in the first receiving recess and provided with a ratchet toothed portion, a mounting portion, a second annular groove, and an abutting portion. The pawl member is mounted in the second receiving recess and provided with an engaging toothed portion, an extension face, an arcuate abutting face, and a curved surface. The elastic member is received in the second receiving recess.

According to the primary advantage of the present invention, the ratchet wrench structure only contains five elements, including the wrench body, the ratchet wheel, the pawl member, the elastic member, and the snap ring, so that ratchet wrench structure has a simplified construction, thereby saving the coast of fabrication.

According to another advantage of the present invention, the second distance is equal to the first distance, and the third distance is equal to the second distance, so that when the first distance has a known value, the values of the second distance and the third distance are also obtained. Thus, various values of the pawl member are designed with reference to that of the wrench body.

According to a further advantage of the present invention, the pawl member includes the third circular arc of the engaging toothed portion, the fourth circular arc of the curved surface, and the fifth circular arc of the arcuate abutting face. The third circular arc of the engaging toothed portion has a radius equal to the first radius of the first circular arc, the fourth circular arc of the curved surface has a radius equal to the second radius of the second circular arc, and the fifth circular arc of the arcuate abutting face has the third radius. Thus, the pawl member has a simplified structure and is designed simply.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
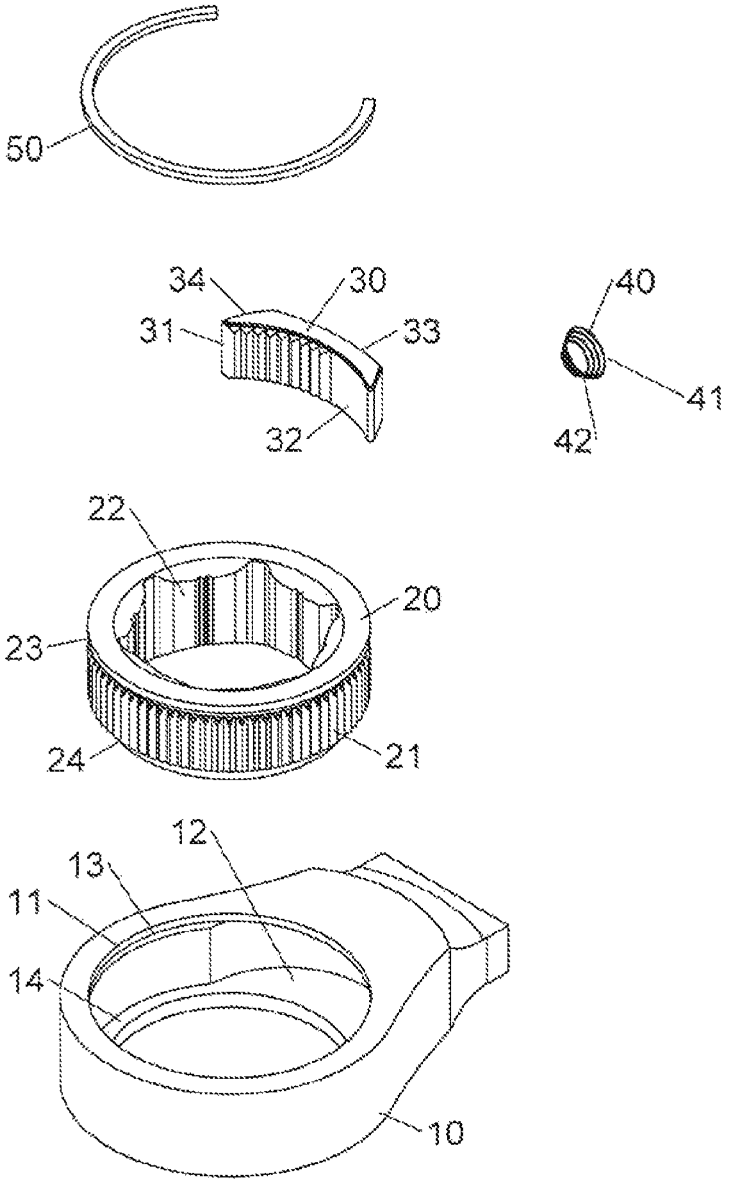
FIG. 1 is an exploded perspective view of a ratchet wrench structure in accordance with the preferred embodiment of the present invention.
Figure 2:
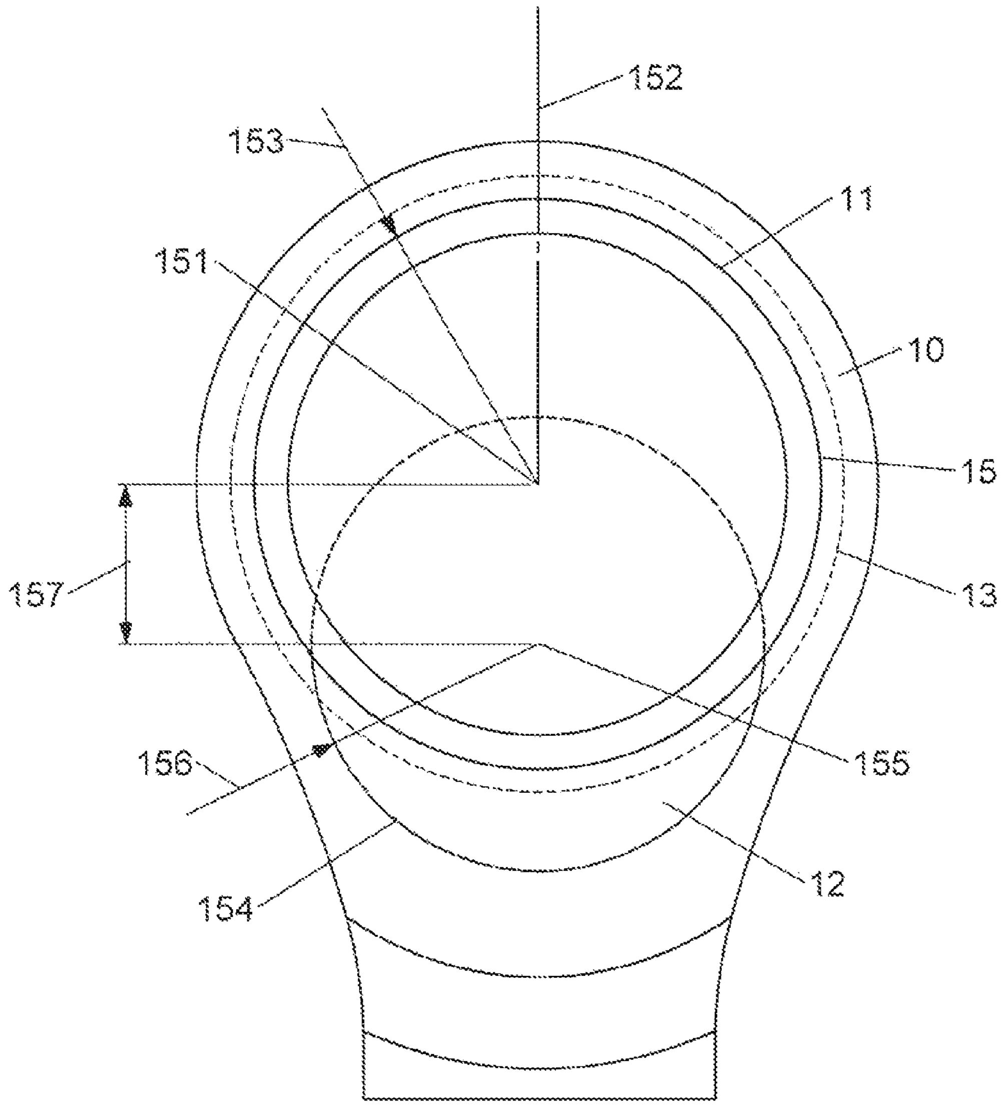
FIG. 2 is a front view of a wrench body of the ratchet wrench structure in accordance with the preferred embodiment of the present invention.

Referring to the drawings and initially to FIGS. 1-4, a ratchet wrench structure in accordance with the preferred embodiment of the present invention comprises a wrench body 10, a ratchet wheel 20, a pawl member 30, an elastic member 40, and a snap ring 50.

The wrench body 10 is provided with a first receiving recess 11, a second receiving recess 12, and a first annular groove 13. The second receiving recess 12 is located beside the first receiving recess 11. The second receiving recess 12 has an axis arranged in the first receiving recess 11. The second receiving recess 12 has a closed top and a closed bottom. The second receiving recess 12 is connected to the first receiving recess 11. The first receiving recess 11 has a bottom provided with an abutting edge 14.

The first receiving recess 11 is provided with a first circular arc (or curve) 15. The first circular arc 15 has a first axis 151. A first vertical line 152 passes through the first axis 151. The first circular arc 15 has a first radius 153. The second receiving recess 12 is provided with a second circular arc (or curve) 154. The second circular arc 154 has a second axis 155. The second axis 155 and the first vertical line 152 coincide or intersect at one point. The second axis 155 and the first vertical line 152 form a cross intersection. The second circular arc 154 has a second radius 156. A first distance 157 is defined between the first axis 151 and the second axis 155.

The ratchet wheel 20 is pivotally mounted in the first receiving recess 11 and has a periphery provided with a ratchet toothed portion 21 arranged in an annular manner. The ratchet wheel 20 is provided with a mounting portion 22. The ratchet wheel 20 is provided with a second annular groove 23 aligning with the first annular groove 13. The ratchet wheel 20 is provided with an abutting portion 24 with a reduced diameter. The abutting portion 24 rests on the abutting edge 14.

The pawl member 30 is mounted in the second receiving recess 12. The pawl member 30 has a front provided with an engaging toothed portion 31 meshing with the ratchet toothed portion 21. The engaging toothed portion 31 has a side provided with an extension face 32. The pawl member 30 has a rear provided with an arcuate abutting face 33. The pawl member 30 has a side provided with a curved surface 34. The curved surface 34 rests on a wall of the second receiving recess 12. The curved surface 34 connects the arcuate abutting face 33 or a round corner is defined between the curved surface 34 and the arcuate abutting face 33.

The engaging toothed portion 31 is provided with a third circular arc (or curve) 36. The third circular arc 36 has a third axis 361. A second vertical line 362 passes through the third axis 361. The engaging toothed portion 31 is arranged at a side of the second vertical line 362. The curved surface 34 forms a fourth circular arc (or curve) 363. The fourth circular arc 363 has a fourth axis 364. The fourth axis 364 and the second vertical line 362 coincide or intersect at one point. A second distance 365 is defined between the third axis 361 and the fourth axis 364.

The third circular arc 36 of the engaging toothed portion 31 and the first circular arc 15 of the first receiving recess 11 have the same diameter. The third axis 361 of the third circular arc 36 and the first axis 151 of the first circular arc 15 coincide mutually. The second vertical line 362 and the first vertical line 152 coincide. The fourth circular arc 363 of the curved surface 34 and the second circular arc 154 of the second receiving recess 12 have the same diameter. The fourth axis 364 of the fourth circular arc 363 and the second axis 155 of the second circular arc 154 coincide mutually. The third circular arc 36 of the engaging toothed portion 31 has a radius equal to the first radius 153 of the first circular arc 15. The fourth circular arc 363 of the curved surface 34 has a radius equal to the second radius 156 of the second circular arc 154. That is, the engaging toothed portion 31 matches the first receiving recess 11, and the curved surface 34 matches the second receiving recess 12.

The arcuate abutting face 33 is provided with a fifth circular arc (or curve) 366. The fifth circular arc 366 has a fifth axis 367. The fifth axis 367 is located outside of a circle of the fourth circular arc 363. The fifth axis 367 and the second vertical line 362 coincide or intersect at one point. The third axis 361 of the third circular arc 36, the fourth axis 364 of the fourth circular arc 363, and the fifth axis 367 of the fifth circular arc 366 coincide with the second vertical line 362 at one point. The fifth circular arc 366 has a third radius 368. A third distance 369 is defined between the fifth axis 367 and the third axis 361.

The extension face 32 has a radius more than that of the third circular arc 36 of the engaging toothed portion 31. The third axis 361 of the third circular arc 36 is an axis of the extension face 32. A fourth distance 3691 is defined between a radius of the extension face 32 and that of the third circular arc 36. The fourth distance 3691 is less than a half of a tooth height of the engaging toothed portion 31.

In practice, the wrench body 10 has various specifications and sizes, at least more than twenty types. Each of the first radius 153, the second radius 156, and the first distance 157 has an integer value. Preferably, the third radius 368 also has an integer value. The third radius 368 is more than the first radius 153. The first radius 153 is more than the second radius 156. The second radius 156 is more than the first distance 157. The second distance 365 is equal to the first distance 157. The third distance 369 is equal to the second distance 365.

The third radius 368 is less than double of the first radius 153. The first radius 153 is 1.20 to 1.30 times of the second radius 156. Preferably, the first radius 153 is 1.25 times of the second radius 156. The second radius 156 is 1.4 to 1.5 times of the first distance 157. Preferably, the second radius 156 is 1.4 to 1.45 times of the first distance 157.

The elastic member 40 is received in the second receiving recess 12 and has a first end 41 and a second end 42. The first end 41 of the elastic member 40 has a diameter more than that of the second end 42. The elastic member 40 has a conic shape by a diameter differential of the first end 41 and the second end 42. The diameter of the first end 41 of the elastic member 40 is substantially equal to a height of the second receiving recess 12, to prevent the elastic member 40 from being moved upward and downward in the second receiving recess 12. The first end 41 of the elastic member 40 presses the wall of the second receiving recess 12. The second end 42 of the elastic member 40 presses the arcuate abutting face 33. Thus, the curved surface 34 of the pawl member 30 presses the wall of the second receiving recess 12 of the wrench body 10.

A space between the second receiving recess 12 and the arcuate abutting face 33 has a maximum value by a position relation between the fifth circular arc 366 of the arcuate abutting face 33 and the second circular arc 154 of the second receiving recess 12, an axis relation between the fifth axis 367 and the second axis 155, and a radius relation between the third radius 368 of the fifth circular arc 366 and the second radius 156 of the second circular arc 154. Thus, the elastic member 40 is disposed at a middle of the second receiving recess 12, and the first vertical line 152 passes through the elastic member 40.

The snap ring 50 is C-shaped and has an elastic feature. The snap ring 50 is received in the first annular groove 13 and the second annular groove 23, so that the ratchet wheel 20 is retained in the first receiving recess 11.

Figure 6:
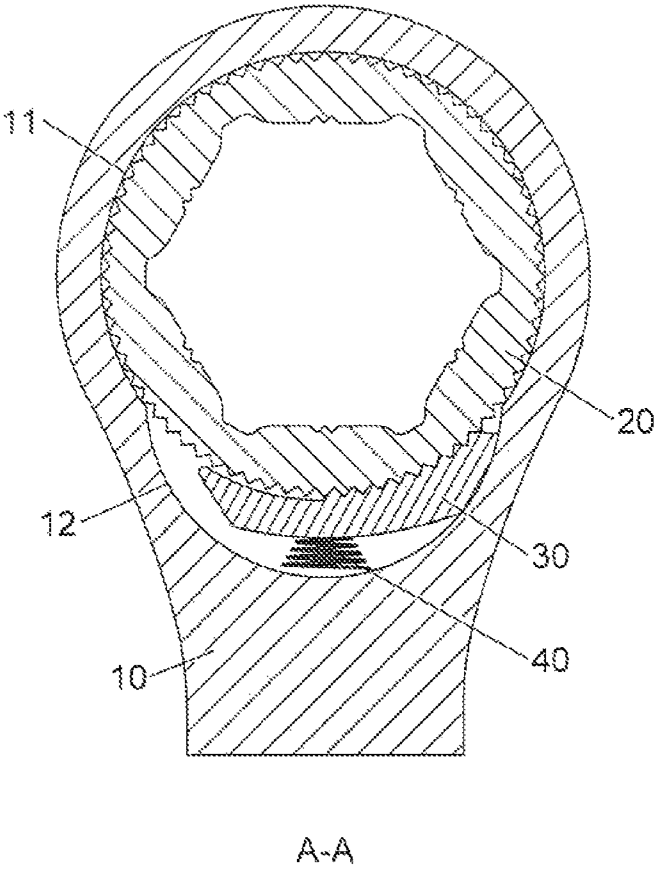
FIG. 6 is a cross-sectional view of the ratchet wrench structure taken along line A-A as shown in FIG. 5.
Figure 5:
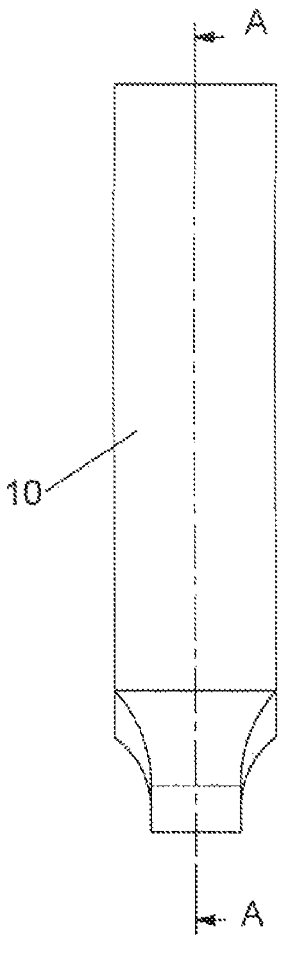
FIG. 5 is a side view of the ratchet wrench structure in accordance with the preferred embodiment of the present invention.

In assembly, referring to FIGS. 5 and 6 with reference to FIGS. 1-4, the ratchet wheel 20 is pivotally mounted in the first receiving recess 11 of the wrench body 10. The pawl member 30 is received in the second receiving recess 12 of the wrench body 10. The elastic member 40 is received in the second receiving recess 12 of the wrench body 10, with the first end 41 abutting the wall of the second receiving recess 12, and with the second end 42 abutting the arcuate abutting face 33 of the pawl member 30, so that the engaging toothed portion 31 of the pawl member 30 meshes with the ratchet toothed portion 21 of the ratchet wheel 20, and the curved surface 34 of the pawl member 30 presses the wall of the second receiving recess 12.

In operation, when the wrench body 10 is rotated counterclockwise, the pawl member 30 is moved backward due to the fourth distance 3691 defined between the extension face 32 and the ratchet toothed portion 21 (or the third circular arc 36 of the engaging toothed portion 31), so that the engaging toothed portion 31 of the pawl member 30 disengages and is detached from the ratchet toothed portion 21 of the ratchet wheel 20. On the contrary, when the wrench body 10 is rotated clockwise, the engaging toothed portion 31 of the pawl member 30 meshes with the ratchet toothed portion 21 of the ratchet wheel 20 again.

Figure 8:
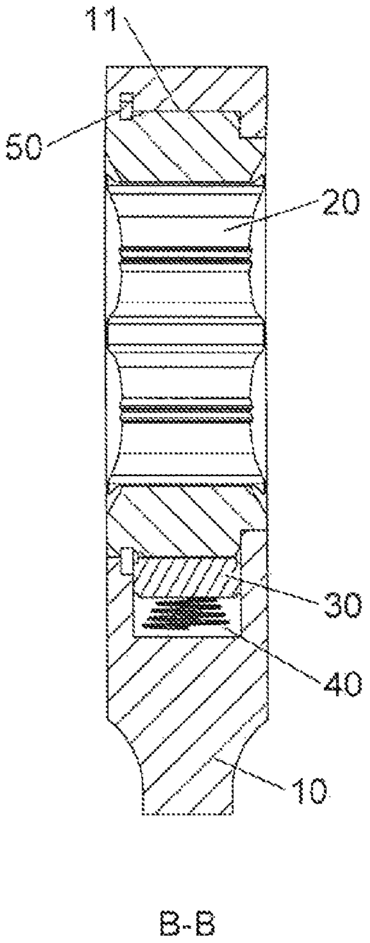
FIG. 8 is a cross-sectional view of the ratchet wrench structure taken along line B-B as shown in FIG. 7.
Figure 7:
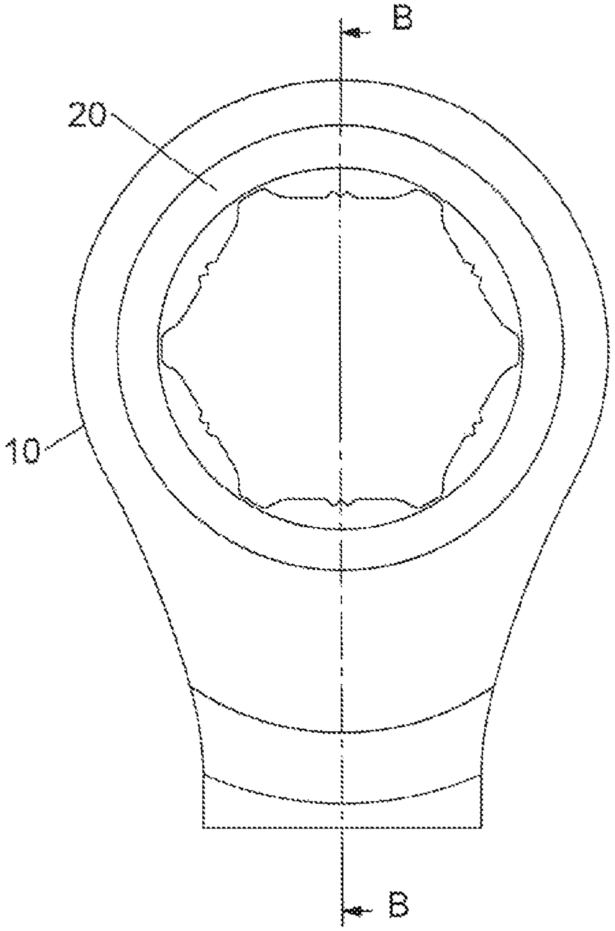
FIG. 7 is a front view of the ratchet wrench structure in accordance with the preferred embodiment of the present invention.

Referring now to FIGS. 7 and 8 with reference to FIGS. 1-6, when the ratchet wheel 20 is inserted into the wrench body 10, the abutting portion 24 of the ratchet wheel 20 rests on the abutting edge 14 of the wrench body 10. At this time, the second annular groove 23 of the ratchet wheel 20 aligns with the first annular groove 13 of the wrench body 10, so that the snap ring 50 is received in the first annular groove 13 of the wrench body 10 and the second annular groove 23 of the ratchet wheel 20, and the ratchet wheel 20 is retained in the first receiving recess 11 of the wrench body 10. In addition, the diameter of the first end 41 of the elastic member 40 is slightly equal to the height of the second receiving recess 12.

Figure 9:
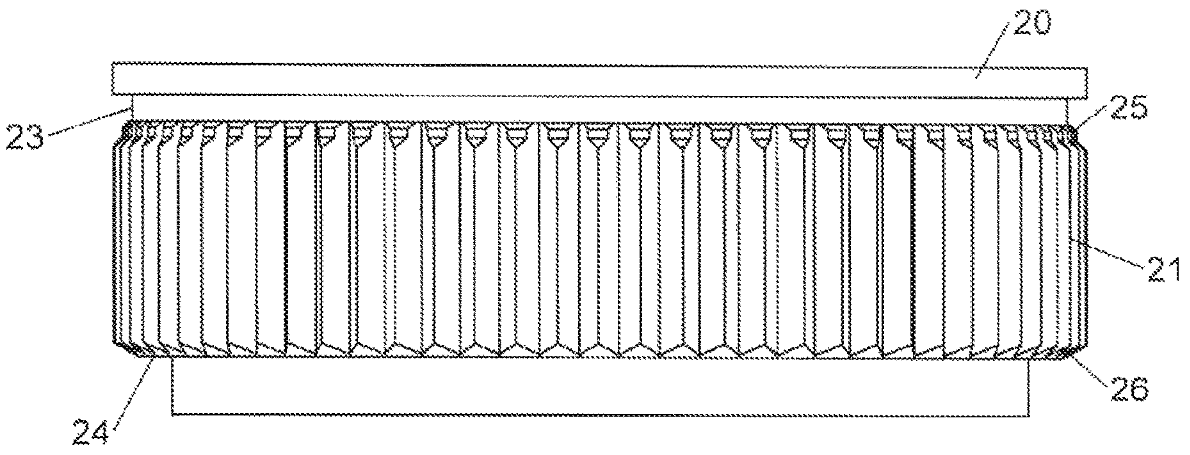
FIG. 9 is a side view of a ratchet wheel of the ratchet wrench structure in accordance with the preferred embodiment of the present invention.

Referring now to FIG. 9, the ratchet toothed portion 21 of the ratchet wheel 20 has an upper end provided with a first guide angle 25 and a lower end provided with a second guide angle 26. The first guide angle 25 has a trapezium shape, and the second guide angle 26 has an oblique shape. The first guide angle 25 and the second guide angle 26 are formed by turning.

In the preferred embodiment of the present invention, the third circular arc 36 of the engaging toothed portion 31 is almost equal to the first circular arc 15 of the first receiving recess 11. A tolerance is defined between the third circular arc 36 and the first circular arc 15 so that the radius of the third circular arc 36 is slightly more than the first radius 153 of the first circular arc 15.

In the preferred embodiment of the present invention, the mounting portion 22 of the ratchet wheel 20 is a polygonal recess.

In another preferred embodiment of the present invention, the mounting portion 22 of the ratchet wheel 20 is a protruding square head for mounting a socket.

Accordingly, the ratchet wrench structure of the present invention has the following advantages.

Figure 3:
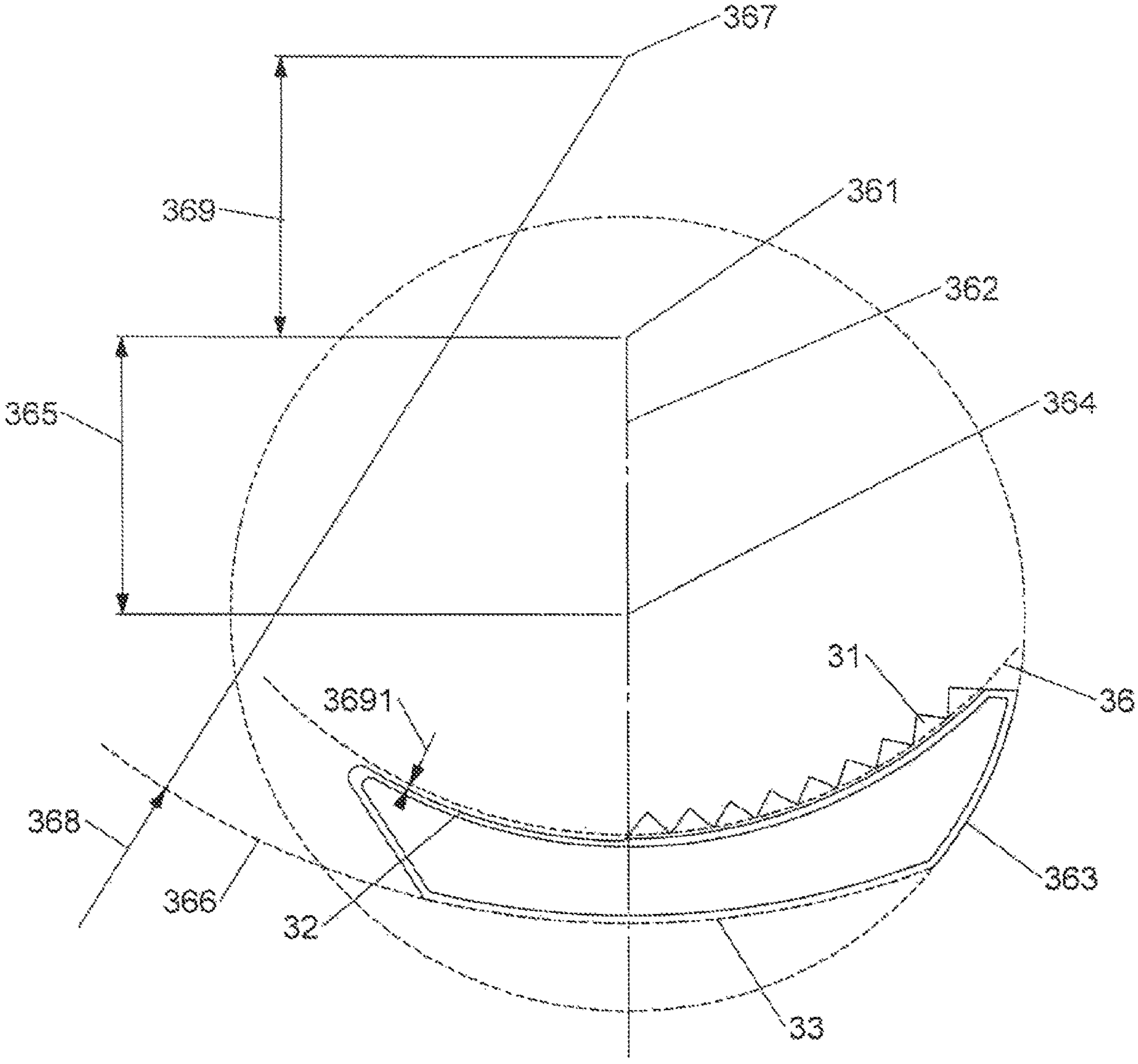
FIG. 3 is a front view of a pawl member of the ratchet wrench structure in accordance with the preferred embodiment of the present invention.
Figure 4:
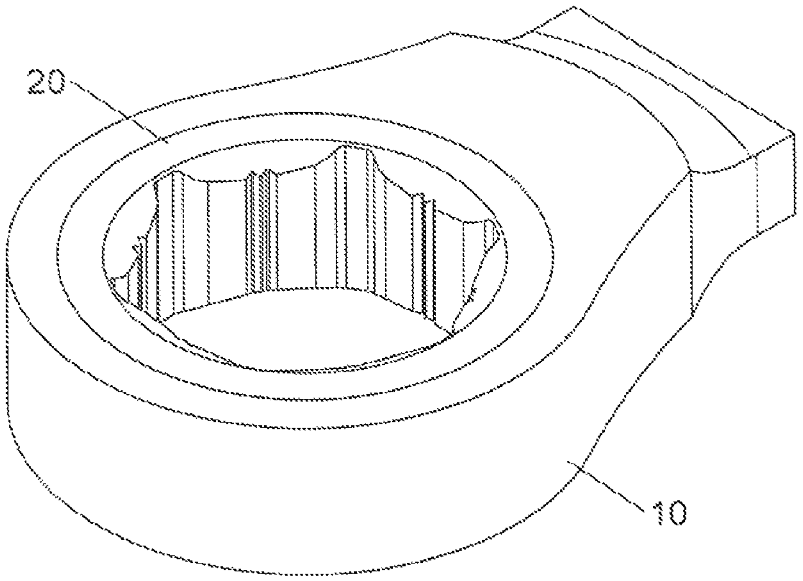
FIG. 4 is a perspective view of the ratchet wrench structure in accordance with the preferred embodiment of the present invention.

1. The ratchet wrench structure only contains five elements, including the wrench body 10, the ratchet wheel 20, the pawl member 30, the elastic member 40, and the snap ring 50, so that ratchet wrench structure has a simplified construction, thereby saving the coast of fabrication.
2. The second distance 365 is equal to the first distance 157, and the third distance 369 is equal to the second distance 365, so that when the first distance 157 has a known value, the values of the second distance 365 and the third distance 369 are also obtained. Thus, various values of the pawl member are designed with reference to that of the wrench body 10.
3. The pawl member 30 includes the third circular arc 36 of the engaging toothed portion 31, the fourth circular arc 363 of the curved surface 34, and the fifth circular arc 366 of the arcuate abutting face 33. The third circular arc 36 of the engaging toothed portion 31 has a radius equal to the first radius 153 of the first circular arc 15, the fourth circular arc 363 of the curved surface 34 has a radius equal to the second radius 156 of the second circular arc 154, and the fifth circular arc 366 of the arcuate abutting face 33 has the third radius 368. Thus, the pawl member 30 has a simplified structure and is designed simply.
4. Referring to FIG. 3, in design of various specifications of the pawl member 30, the pawl member 30 contains the first radius 153, the second radius 156, and the third radius 368. The second distance 365, the third distance 369, and the first distance 157 are equal to each other. The fourth axis 364 of the fourth circular arc 363 and the fifth axis 367 of the fifth circular arc 366 are arranged on the first vertical line 152 and the second vertical line 362. The pawl member 30 is drafted according to the above information. In practice, the pawl member 30 is initially symmetric relative to the first vertical line 152. Then, the engaging toothed portion 31 at the left side of the first vertical line 152 is cleared to draw the extension face 32. Thus, the pawl member 30 is drafted accordingly. In such a manner, the pawl member 30 is designed according to various known numbers to save the working time for designing various specifications of the pawl member 30.
5. Various values of the pawl member 30 correlate and correspond to relative ones of the wrench body 10 by mathematic expressions, so that many values of the pawl member 30 are directly taken from that of the wrench body 10 to facilitate design of the pawl member 30.
6. The elastic member 40 is received in the second receiving recess 12 of the wrench body 10 and has a conic shape, with the first end 41 abutting the wall of the second receiving recess 12, and with the second end 42 abutting the arcuate abutting face 33 of the pawl member 30, so that the engaging toothed portion 31 of the pawl member 30 meshes with the ratchet toothed portion 21 of the ratchet wheel 20 exactly.
7. The fourth distance 3691 is defined between the extension face 32 of the pawl member 30 and the ratchet toothed portion 21 of the ratchet wheel to provide an allowance for rotation of the pawl member 30, to prevent the ratchet toothed portion 21 of the ratchet wheel 20 from rubbing or wearing the extension face 32 of the pawl member 30.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:

1. A ratchet wrench structure comprising:

a wrench body, a ratchet wheel, a pawl member, an elastic member, and a snap ring;

wherein:

the wrench body is provided with a first receiving recess, a second receiving recess, and a first annular groove;

the second receiving recess is located beside the first receiving recess;

the second receiving recess has an axis arranged in the first receiving recess;

the second receiving recess has a closed top and a closed bottom;

the second receiving recess is connected to the first receiving recess;

the first receiving recess has a bottom provided with an abutting edge;

the first receiving recess is provided with a first circular arc;

the first circular arc has a first axis;

a first vertical line passes through the first axis;

the first circular arc has a first radius;

the second receiving recess is provided with a second circular arc;

the second circular arc has a second axis;

the second axis and the first vertical line coincide at one point;

the second circular arc has a second radius;

a first distance is defined between the first axis and the second axis;

the ratchet wheel is pivotally mounted in the first receiving recess and has a periphery provided with a ratchet toothed portion arranged in an annular manner;

the ratchet wheel is provided with a mounting portion;

the ratchet wheel is provided with a second annular groove aligning with the first annular groove;

the ratchet wheel is provided with an abutting portion with a reduced diameter;

the abutting portion rests on the abutting edge;

the ratchet toothed portion has an upper end provided with a first guide angle and a lower end provided with a second guide angle;

the first guide angle has a trapezium shape;

the second guide angle has an oblique shape;

the pawl member is mounted in the second receiving recess;

the pawl member has a front provided with an engaging toothed portion meshing with the ratchet toothed portion;

the engaging toothed portion has a side provided with an extension face;

the pawl member has a rear provided with an arcuate abutting face;

the pawl member has a side provided with a curved surface;

the curved surface rests on a wall of the second receiving recess;

the curved surface connects the arcuate abutting face;

the engaging toothed portion is provided with a third circular arc;

the third circular arc has a third axis;

a second vertical line passes through the third axis;

the engaging toothed portion is arranged at a side of the second vertical line;

the curved surface forms a fourth circular arc;

the fourth circular arc has a fourth axis;

the fourth axis and the second vertical line coincide at one point;

a second distance is defined between the third axis and the fourth axis;

the third circular arc and the first circular arc have the same diameter;

the third axis and the first axis coincide mutually;

the second vertical line and the first vertical line coincide;

the fourth circular arc and the second circular arc have the same diameter;

the fourth axis and the second axis coincide mutually;

the third circular arc has a radius equal to the first radius;

the fourth circular arc has a radius equal to the second radius;

the engaging toothed portion matches the first receiving recess, and the curved surface matches the second receiving recess;

the arcuate abutting face is provided with a fifth circular arc;

the fifth circular arc has a fifth axis;

the fifth axis is located outside of a circle of the fourth circular arc;

the fifth axis and the second vertical line coincide at one point;

the third axis, the fourth axis, and the fifth axis coincide with the second vertical line at one point;

the fifth circular arc has a third radius;

a third distance is defined between the fifth axis and the third axis;

the extension face has a radius more than that of the third circular arc;

the third axis is an axis of the extension face;

a fourth distance is defined between a radius of the extension face and that of the third circular arc;

the fourth distance is less than a half of a tooth height of the engaging toothed portion;

each of the first radius, the second radius, and the first distance has an integer value;

the third radius preferably has an integer value;

the third radius is more than the first radius;

the first radius is more than the second radius;

the second radius is more than the first distance;

the second distance is equal to the first distance;

the third distance is equal to the second distance;

the third radius is less than double of the first radius;

the first radius is 1.20 to 1.30 times of the second radius;

the second radius is 1.4 to 1.5 times of the first distance;

the elastic member is received in the second receiving recess and has a first end and a second end;

the first end has a diameter more than that of the second end;

the elastic member has a conic shape by a diameter differential of the first end and the second end;

the diameter of the first end is equal to a height of the second receiving recess, to prevent the elastic member from being moved upward and downward in the second receiving recess;

the first end presses the wall of the second receiving recess;

the second end presses the arcuate abutting face;

the curved surface presses the wall of the second receiving recess;

a space between the second receiving recess and the arcuate abutting face has a maximum value by a position relation between the fifth circular arc and the second circular arc, an axis relation between the fifth axis and the second axis, and a radius relation between the third radius and the second radius;

the elastic member is disposed at a middle of the second receiving recess;

the first vertical line passes through the elastic member;

the snap ring is C-shaped; and the snap ring is received in the first annular groove and the second annular groove, so that the ratchet wheel is retained in the first receiving recess.

2. The ratchet wrench structure as claimed in claim 1, wherein the mounting portion is a polygonal recess or the mounting portion is a protruding square head.

3. The ratchet wrench structure as claimed in claim 1, wherein the third circular arc is equal to the first circular arc, and a tolerance is defined between the third circular arc and the first circular arc so that the radius of the third circular arc is slightly more than the first radius.

* * * * *